United States Patent
Lee et al.

(10) Patent No.: US 10,107,412 B2
(45) Date of Patent: Oct. 23, 2018

(54) OIL PUMP CONTROL VALVE

(71) Applicant: UNICK CORPORATION, Gimhae-si, Gyeongsangnam-do (KR)

(72) Inventors: Chang-Hoon Lee, Gimhae-si (KR); Kuk-Chan Moon, Busan (KR); Ji-Hoon Park, Busan (KR); Mun-Hak Kim, Busan (KR)

(73) Assignee: UNICK CORPORATION, Gimhae-si, Gyeongsangnam-do (KR)

( * ) Notice: Subject to any disclaimer, the term of this patent is extended or adjusted under 35 U.S.C. 154(b) by 0 days.

(21) Appl. No.: 15/323,663

(22) PCT Filed: Jun. 29, 2015

(86) PCT No.: PCT/KR2015/006653
§ 371 (c)(1),
(2) Date: Jan. 3, 2017

(87) PCT Pub. No.: WO2016/003139
PCT Pub. Date: Jan. 7, 2016

(65) Prior Publication Data
US 2017/0152962 A1    Jun. 1, 2017

(30) Foreign Application Priority Data

Jul. 3, 2014 (KR) ........................ 10-2014-0082974

(51) Int. Cl.
*F16K 31/06* (2006.01)
*F01M 1/16* (2006.01)
*F01M 1/02* (2006.01)

(52) U.S. Cl.
CPC ............ *F16K 31/0665* (2013.01); *F01M 1/02* (2013.01); *F01M 1/16* (2013.01); *F16K 31/0631* (2013.01); *F01M 2001/0292* (2013.01)

(58) Field of Classification Search
CPC ...... F16K 31/0665; F16K 1/14; F16K 11/056; F16K 27/0245; F16K 31/062;
(Continued)

(56) References Cited

U.S. PATENT DOCUMENTS

| 4,050,477 A | 9/1977 | Acar |
| 2014/0219847 A1* | 8/2014 | Watanabe ............. F04C 2/3442 418/24 |
| 2016/0327176 A1* | 11/2016 | Nemoto ................ F16K 31/082 |

FOREIGN PATENT DOCUMENTS

| CN | 103906899 A | 7/2014 |
| JP | 11-280935 A | 10/1999 |

(Continued)

OTHER PUBLICATIONS

Extended European Search Report dated Jun. 9, 2017 from European Patent Office in connection with the counterpart European Patent Application No. 15814592.0.
(Continued)

*Primary Examiner* — Jacob Amick
(74) *Attorney, Agent, or Firm* — Hauptman Ham, LLP

(57) ABSTRACT

The present invention relates to an oil pump control valve that can linearly control the pressure of oil by resolving the internal residual pressure thereof and can be mounted on the exterior of a cylinder block, thereby enhancing maintenance efficiency. The oil pump control valve comprises a valve that controls the entrance and exit of oil and a solenoid that operates the valve.

9 Claims, 5 Drawing Sheets

(58) Field of Classification Search
CPC ... F16K 31/0631; F16K 31/0662; F01M 1/16; F01M 1/02
See application file for complete search history.

(56) References Cited

FOREIGN PATENT DOCUMENTS

| | | |
|---|---|---|
| JP | 2001343086 A | 12/2001 |
| JP | 2003-207069 A | 7/2003 |
| KR | 10-2001-0014208 A | 2/2001 |
| KR | 10-2004-0092363 | 11/2004 |
| KR | 10-2011-0056811 A | 5/2011 |
| KR | 10-1167505 B1 | 7/2012 |
| WO | 2013/066062 A | 10/2013 |

OTHER PUBLICATIONS

International Search Report dated Jul. 14, 2015 corresponding to International Application PCT/KR2015/006653.
Japanese Office Action dated Nov. 17, 2017 in connection with the counterpart Japanese Patent Application No. 2017-500079.
Chinese Office Action dated Jun. 1, 2018, in connection with the Chinese Patent Application No. 201580036241.4.

\* cited by examiner

OIL PUMP CONTROL VALVE

CROSS REFERENCE TO RELATED APPLICATION

This application claims the priority of Korean Patent Application No. 10-2014-0082974, filed on Jul. 03, 2014, in the KIPO (Korean Intellectual Property Office). Further, this application is the National Phase Application of International Application No. PCT/KR2015/006653, filed Jun. 29, 2015, which designates the United States and was published in Korean. Both of the priority documents are hereby incorporated by reference in their entireties.

TECHNICAL FIELD

The present invention relates to an oil pump control valve, and more particularly, an oil pump control valve that may control the oil pressure linearly by eliminating the residual pressure inside the valve and may be mounted outside a cylinder block to improve workability during maintenance.

BACKGROUND ART

The engine of an automobile is designed to circulate the oil for lubrication and cooling of various components mounted on the engine. Such an engine is provided with an oil pump for circulating the oil and a relief valve for preventing the oil pressure (hereinafter, referred to as "hydraulic pressure") from being excessively raised by the oil pump.

Korean Patent Application Publication No. 2011-0056811 (May 31, 2011) discloses an oil pump including a relief valve 20.

Referring to FIG. 5, a conventional oil pump 1 includes a housing 10 having a transport path 12 therein, and a relief valve 20 installed on the transport path 12. According to the structure of the oil pump 1, the oil introduced into a lower portion of the housing 10 is transported along the transport path 12, compressed at a predetermined pressure in the transport process, and is then discharged through the side surface of the housing 10. The relief valve 20 installed on the transport path 12 discharges part of the transported oil to the outside when the discharged hydraulic pressure excessively rises. That is, when the discharged hydraulic pressure becomes equal to or higher than a set pressure, the relief valve 20 is operated to open the drain port 22 to discharge a part of the oil.

The oil pump 1 having the above-described structure is operated by a camshaft, and accordingly when the revolutions per minute (rpm) of the engine rises, the hydraulic pressure discharged from the oil pump 1 also rises. Accordingly, the hydraulic pressure circulated in the engine is not maintained to be constant, and lubrication and cooling of various parts such as the cylinder head and the cylinder block are not smoothly performed. In particular, excessive pressure is applied to various parts, thereby causing a significant decrease in durability.

The applicant filed an oil pump control valve (Korean Patent No. 1167505 (Jul. 16, 2012)), which is capable of maintaining a constant hydraulic pressure forcibly transported and discharged from the oil pump to the engine in order to solve the above problems.

The process of hydraulic pressure control by the conventional oil pump control valve will be described below.

When the solenoid is operated, the ball valve is lowered to open an inlet connected to an introduction port, the oil is introduced through the open inlet, and the introduced oil is controlled at a predetermined pressure and then discharged toward the engine through a control port. On the other hand, when the solenoid is stopped, the ball valve rises and closes the inlet, and the oil discharged toward the engine flows into the valve through the control port. At this time, the oil introduced into the valve when the solenoid is stopped is transported to the drain port through a space between a second valve seat and a rod.

Since the through-hole of the second valve seat has a diameter slightly larger than that of the rod so as to guide the movement of the rod, the amount of oil discharged to the space between the second valve seat and the rod is not so large. Therefore, a residual pressure always exists inside the valve, and the ball valve may not operate smoothly due to the residual pressure. In particular, if the operation of the ball valve is not smooth, the hydraulic pressure discharged toward the engine cannot be finely adjusted.

Further, the conventional oil pump control valve has a structure in which the drain port is located at the lower end of the valve. In order to mount the oil pump control valve having such a structure to the outside of the cylinder block, an oil passage needs to be formed at a position adjacent to the outer wall of the cylinder block. However, if the oil passage is positioned close to the outer wall, it is difficult to process the cylinder block, and the thickness of the corresponding portion becomes thin, resulting in poor durability and cracking due to hydraulic pressure.

DISCLOSURE

Technical Problem

It is an aspect of the present invention to provide an oil pump control valve capable of linearly controlling the pressure of the oil by eliminating the internal residual pressure of the valve and being able to be mounted outside the cylinder block to improve workability during maintenance.

Technical Solution

In accordance with one aspect of the present invention, an oil pump control valve includes a valve for regulating an entry and exit of an oil and a solenoid for operating the valve.

The valve includes: a tubular holder including an introduction port formed at an upper end thereof, a control port formed at an upper portion of a middle part thereof and a discharge port formed at a lower portion of the middle part; a first valve installed inside the holder and positioned between the introduction port and the control port, the first valve including an inlet connected to the introduction port and a first outlet connected to the control port and formed at an upper end and lower end thereof; a ball valve movably installed inside the first valve seat to open or close the inlet; a second valve seat installed at a lower portion of the first valve seat and communicating with an interior of the first valve seat, the second valve seat being formed in a tube shape and provided at a middle part thereof with a second outlet connected to the discharge port; and a rod movably installed in the second valve seat and operated by the solenoid to move the ball valve, at least a portion of the rod is smaller than an inner diameter of the second valve seat According to the above-described configuration, the oil transported to the engine side through the valve during operation of the solenoid flows back into the valve through the control port when the operation of the solenoid is stopped. At this time, since the ball valve is raised to close the inlet of the first valve seat, the introduced oil is discharged to the discharge port through the first valve seat, the second valve seat and the second outlet, and is then transported to the oil tank side.

The solenoid includes: a case coupled to surround one end of the holder and one end of the second valve seat and having an accommodation space therein; a bobbin installed in the accommodation space, the bobbin being in close contact with the flange and having a coil wound around an outer circumferential surface thereof; a guide installed inside the bobbin and having an upper end inserted into the second valve seat; a core coupled to a lower end of the bobbin and partially inserted into the guide; a plunger movably installed in the guide, a lower end of the rod being inserted thereinto; and a spring installed between the core to elastically support the plunger.

In the present invention configured as described above, the oil introduced through the control port when the operation of the solenoid is stopped is discharged to the oil tank side through the discharge port via the second valve seat and the rod. Therefore, a residual pressure will not occur in the valve. In addition, the operation failure due to the residual pressure may be solved, and the pressure of the oil discharged to the engine side may be linearly controlled.

Further, the present invention may easily form the oil passage of the cylinder block since the discharge port is formed in the middle part of the valve. In particular, since the oil pump control valve of the present invention can be mounted on the outside of the cylinder block, workability in maintenance may be improved, and manpower and cost required for the operation may be reduced.

Figure 1:
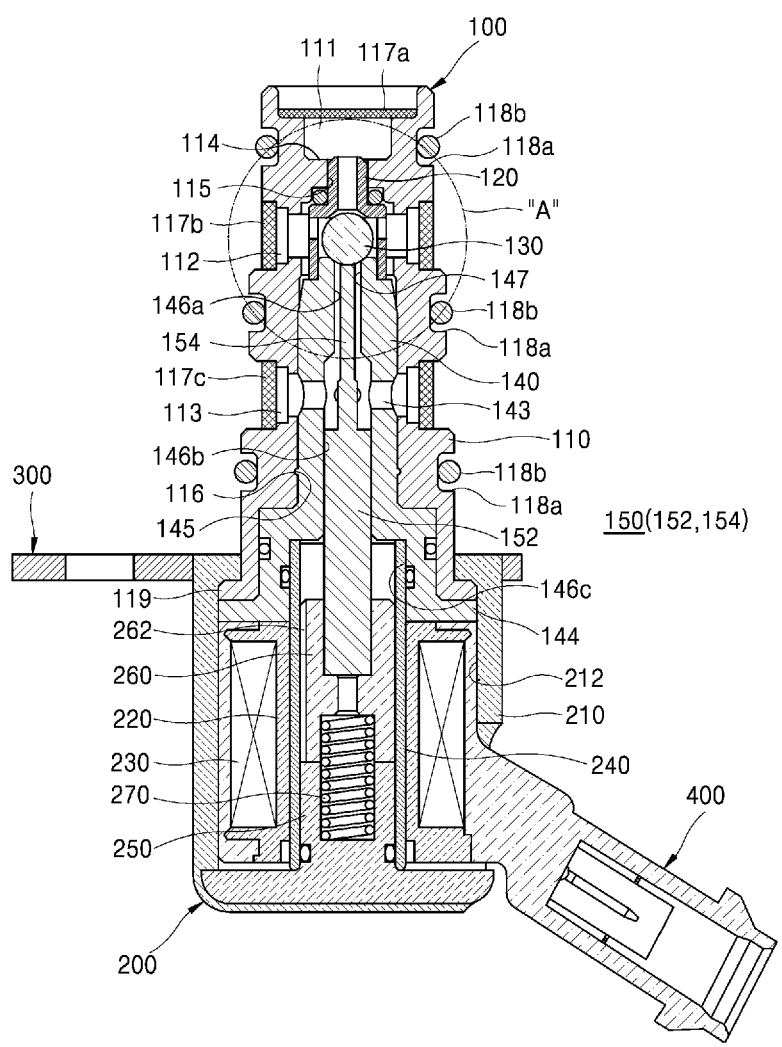
FIG. 1 is a cross-sectional view illustrating an oil pump control valve according to an embodiment of the present invention.

| 100: Valve | 110: Holder |
|---|---|
| 120: First valve seat | 130: Ball valve |
| 140: Second valve seat | 150: Rod |
| 200: Solenoid | 210: Case |
| 220: Bobbin | 230: Coil |
| 240: Guide | 250: Core |
| 260: Plunger | 270: Spring |
| 300: Bracket | 400: Connector. |

BEST MODE

Hereinafter, exemplary embodiments of the present invention will be described in detail with reference to the accompanying drawings, wherein like reference numerals are used to refer to like elements throughout.

As shown in FIG. 1, an oil pump control valve according to an embodiment of the present invention includes a valve 100 for regulating the entry and exit of oil, a solenoid 200 for operating the valve 100, a bracket 300 for fixing the oil pump control valve to a cylinder block (not shown), and a connector 400 for applying power to the solenoid 200.

The valve 100 includes a holder 110 inserted into the cylinder block (not shown) when the oil pump control valve is installed, a first valve seat 120 installed inside the holder 110, a ball valve 130 installed in the first valve seat 120, a second valve seat 140 provided at a lower portion of the first valve seat 120, and a rod 150 installed inside the second valve seat 140.

The holder 110 is formed in the shape of a hollow tube having a predetermined length. An introduction port 111 is formed on the top surface of the holder 110, and a control port 112 and a discharge port 113 are formed on an outer circumferential surface of the middle part of the holder 110. The introduction port 111 is a port through which oil supplied from an oil pump (not shown) is introduced, the control port 112 is a port through which the oil controlled to a predetermined pressure by the valve 100 is discharged to the engine side, and the discharge port 113 is a port through which the oil returned from the engine side is discharged to the oil tank side. The control port 112 is located at the upper portion of the middle part of the holder 110, and the discharge port 113 is located at the lower portion of the middle part of the holder 110.

Forming the discharge port 113 in the middle part of the holder 110 is intended to space the oil passage formed in the cylinder block (not shown) apart from the outer wall so as to improve workability and prevent breakage of the passage by hydraulic pressure. Positioning the discharge port 113 adjacent to the control port 112 is intended to facilitate discharge of the oil introduced through the control port 112 to the discharge port 113 to prevent a residual pressure from being formed in the value 100.

A partition 114 having a predetermined thickness is formed at an upper portion of the inner wall of the holder 110, more specifically, between the introduction port 111 and the control port 112. The partition 114 is provided with a mount hole 115 for installation of the first valve seat 120. In addition, a mount groove 116 for installing the second valve seat 140 is formed in the lower portion of the inner wall of the holder 110.

Filters 117a to 117c are provided in the introduction port 111, the control port 112, and the discharge port 113 to filter out foreign substances contained in the oil. The filter 117a provided in the introduction port 111 is a plate-shaped filter inserted into the upper end of the holder 110 and the filters 117b and 117c provided in the control port 112 and the discharge port 113 are annular filters surrounding the outer circumferential surface of the holder 110.

Meanwhile, an annular groove 118a is formed on the outer circumferential surface of the holder 110, and a ring-shaped O-ring 118b is provided in the groove 118a. The O-ring 118b serves to prevent the oil from leaking into a space between the oil pump control valve and the cylinder block (not shown). The O-ring 118b serves to prevent the oil introduced from the oil pump (not shown) or the engine (not shown) from abnormally flowing into the port other than the intended port. The groove 118a and the O-ring 118b are provided between the introduction port 111 and the control port 112, between the control port 112 and the discharge port 113, and between the discharge port 113 and the flange 119.

Figure 2:
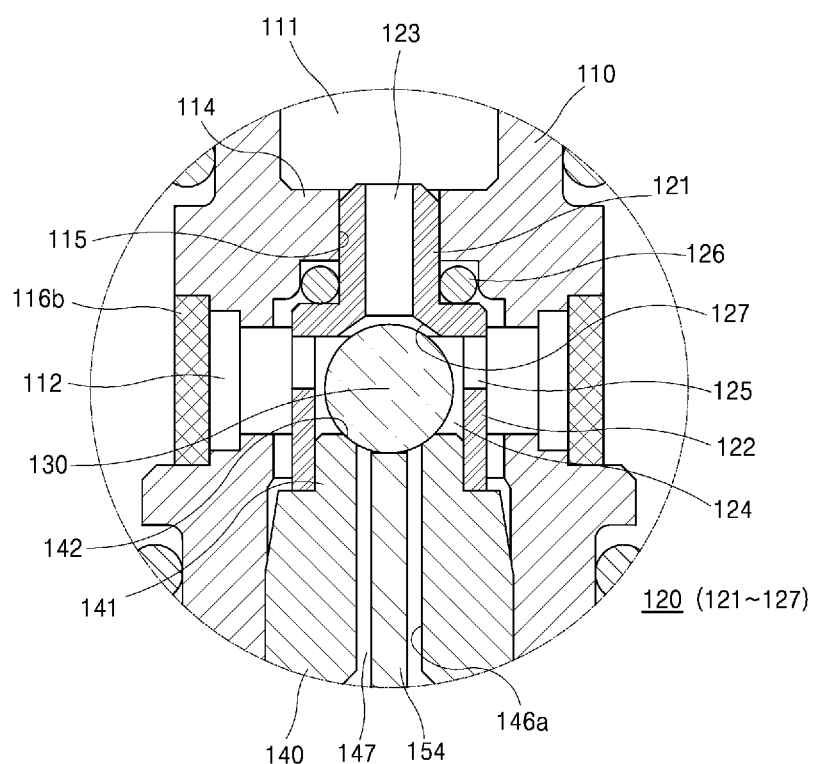
FIG. 2 is an enlarged view of a portion "A" in FIG. 1.

Referring to FIG. 2, the first valve seat 120 is installed between the introduction port 111 and the control port 112. The first valve seat 120 includes a small-diameter tube 121 inserted in the mount hole 115 and a large-diameter tube 122 formed at a lower portion of the small-diameter tube 121. An inlet 123 connected to the introduction port 111 is formed inside the small-diameter tube 121. An operation space 124 in which the ball valve 130 is installed is defined in the large-diameter tube 122, and a first outlet 125 connected to the control port 112 is formed on the outer circumferential surface of the large-diameter tube 122.

As described above, the first valve seat 120 is installed to be inserted into the mount hole 115 of the partition 114, and a packing 126 is interposed between the first valve seat 120 and the partition 114. The packing 126 serves to prevent the oil from leaking into a space between the holder 110 and the first valve seat 120.

The ball valve 130 is movably installed in the operation space 124 of the first valve seat 120 to open or close the inlet 123. The ball valve 130 is formed in a completely spherical shape so as to reliably seal the inlet 123 upon contact with the first valve seat 120. A first seating groove 127 and a second seating groove 142 are formed at the lower end of the inlet 123 and the upper end of the protrusion 141 which come into contact with the ball valve 130 when the ball valve 130 moves.

As shown in FIGS. 1 and 2, the second valve seat 140 has a multi-step tube shape having a larger diameter toward the lower end. The upper end of the second valve seat 140 is provided with a protrusion 141 having a smaller diameter than the lower end and middle part of the second valve seat 140, and the second seating groove 142 is formed on the upper surface of the protrusion 141 to seat the ball valve 130 thereon. A second outlet 143 connected to the discharge port 113 is formed on the outer circumferential surface of the middle part of the second valve seat 140, and a flange 144 interposed between the holder 110 of the valve 100 and a bobbin 220 of the solenoid 200 is formed on the outer circumferential surface of the lower end of the second valve seat 140. In addition, the outer circumferential surface between the second outlet 143 and the flange 144 is provided with a mount protrusion 145 to be inserted into the mount groove of the holder 110.

The internal space 146a to 146c of the second valve seat 140 is formed in a multi-step shape having a larger diameter toward the lower end. The upper end 146a of the internal space is a portion penetrated by the small-diameter portion 154 of the rod 150 and is formed to have a diameter larger than that of the small-diameter portion 154 such that the discharge passage 147 is provided between the upper end 146a and the small-diameter portion 154. The middle part 146b of the internal space serves to guide movement of the rod 150 and is formed in a diameter that allows the middle part to contact the large-diameter portion 152. The lower end 146c of the internal space is formed with a larger diameter than the middle part 146b, and the upper part of the guide 240, which will be described later, is inserted thereinto.

The lower end of the second valve seat 140, that is, the lower end provided with the flange 144 is positioned at an upper portion of the bobbin 220 serves as a yoke, which is a fixed iron core. When the lower end of the second valve seat 140 functions as a yoke, the magnetic force generated around the bobbin 220 may be strengthened to reliably control the movement of the plunger 260, which is a movable iron core.

The rod 150 is in the form of a multi-step rod including a large-diameter portion 152 contacting the second valve seat 140 and a small-diameter portion 154 spaced apart from the second valve seat 140. The lower end of the large-diameter portion 152 is inserted into the plunger 260 and moves together with the plunger 260 when the solenoid 200 is operated.

The solenoid 200 will be described with reference to FIG. 1.

The solenoid 200 includes a case 210, a bobbin 220 installed inside the case 210, a coil 230 wound around the outer circumferential surface of the bobbin 220, a guide 240 inserted into the bobbin 220, a core 250 coupled to the lower end of the bobbin 220, a plunger 260 movably installed inside the guide 240, and a spring 270 installed between the core 250 and the plunger 260.

The case 210 has a cup shape with an open top and a closed bottom. A housing space 212 is defined in the case 210. The bobbin 220, the coil 230, the guide 240, the core 250, the plunger 260, and the spring 270 are installed in the case 210. At this time, the upper end of the case 210 is caulked so as to surround the lower end of the holder 110. When the upper end of the case 210 is caulked, the valve 100 is pressed against the solenoid 200 to closely contact the components 220 to 270 installed inside the case 210. Therefore, it is possible to prevent the components 220 to 270 installed inside the case 210 from moving and to prevent foreign substances from flowing into the upper portion of the case 210.

The bobbin 220 is in the form of a hollow spool having flanges formed at the upper and lower ends thereof. The second valve seat 140 is positioned at the upper portion of the bobbin 220, the core 250 is coupled to the lower portion of the bobbin 220, and the coil 230 for generating a magnetic field is wound around the outer circumferential surface of the bobbin 220. The bobbin 220 is made of an insulator so as to electrically isolate the coil 230 from the core 250 and the plunger 260. In this case, the second valve seat 140 positioned at the upper portion of the bobbin 220 may serve as a fixed iron core together with the core 250.

The coil 230 is a conductive wire for generating a magnetic field around the bobbin 220 when power is applied thereto. The coil 230 is closely and uniformly wound around the outer circumferential surface of the bobbin 220 to form a cylindrical shape. The magnetic field generated in the coil 230 when power is applied is induced by the core 250 to lower the plunger 260. At this time, the intensity of the magnetic field is proportional to the intensity of the current flowing along the coil 230 and the number of the coils 230 wound around the bobbin 220. Therefore, as a strong current flows along the coil 230 or the number of windings of the coil 230 increases, the magnetic field becomes strong, ensuring that the movement of the plunger 260 is reliably controlled.

The guide 240 has a shape of a tube with a predetermined length and is inserted into the bobbin 220 in a penetrating manner The upper portion of the guide 240 protrudes through the bobbin 220 and is inserted into the lower end 146c of the internal space provided in the second valve seat 140. The guide 240 guides the movement of the plunger 260 and prevents an external force from deforming the solenoid 200.

The core 250 is a fixed iron core for moving the plunger 260, which is a movable iron core, when power is applied. The core 250 is formed in a multi-step disc shape, and coupled to the bobbin 220 such that a part of the core 250 is inserted into the bobbin 220. As shown in FIG. 2, as the core 250 is formed in a multi-step disc shape, a magnetic field generated in the coil 230 is concentrated at the core 250. Therefore, when the power is applied, the plunger 260, which is a movable iron core, may easily move toward the core 250.

The plunger 260 is a metal rod that is moved up and down inside the bobbin 220 by a magnetic field generated by the coil 230. The large-diameter portion 152 of the rod 150 is inserted into the upper surface of the plunger 260 and a movement groove 262 is formed in the outer circumferential surface of the plunger 260. The movement groove 262 is provided to minimize the operation resistance of the plunger 260 and functions as a passage through which the fluid filling the guide 240 is transported when the plunger 260 moves.

The spring 270 is a typical coil spring and elastically supports the plunger 260 upward. That is, the spring 270 elastically supports the plunger 260 upward to maintain the ball valve 130 at an elevated position in normal times when power is not applied to the solenoid 200.

Hereinafter, operation of the oil pump control valve according to the present embodiment will be described with reference to FIGS. 3 and 4.

Figure 3:
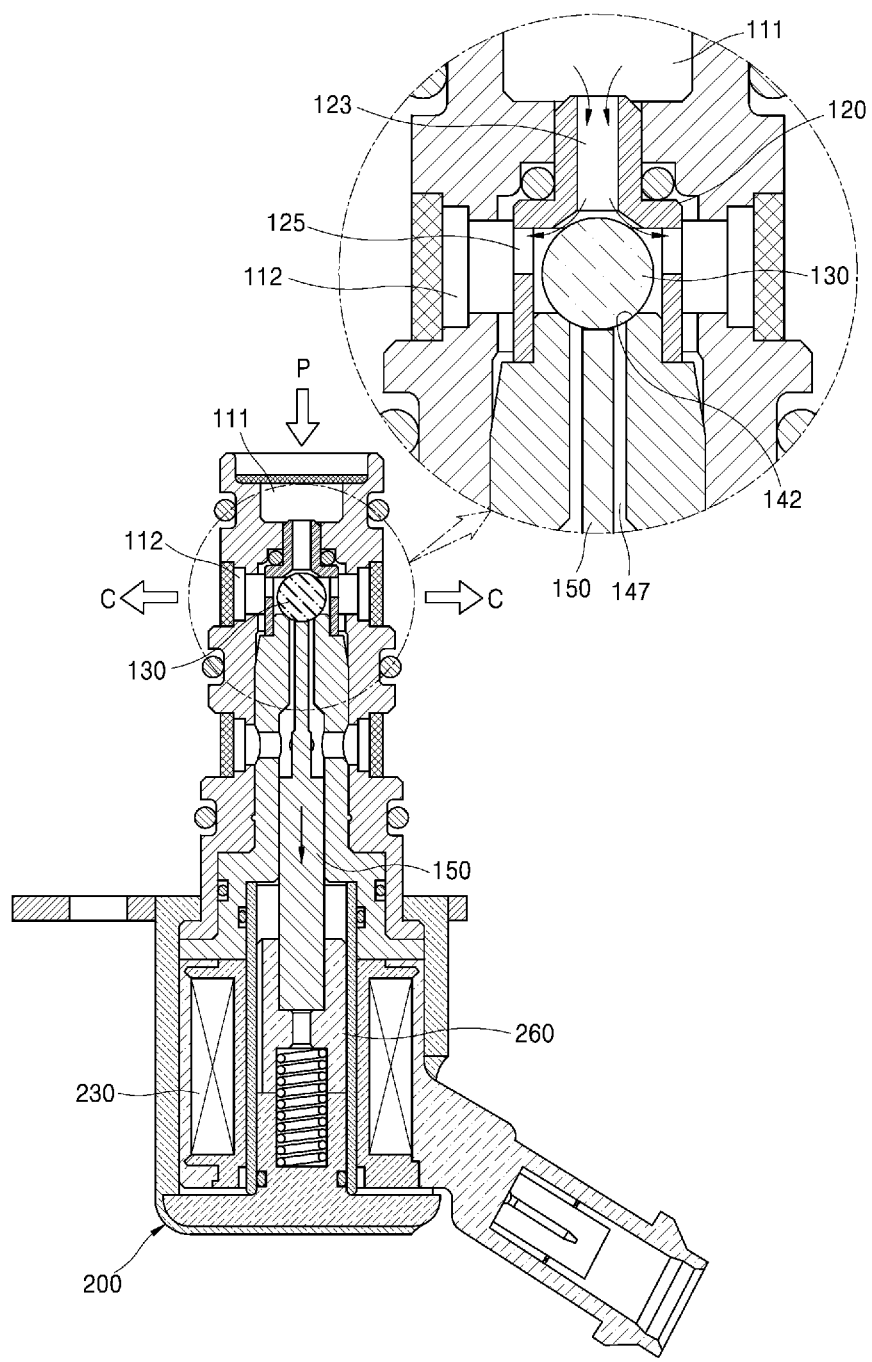
FIGS. 3 and 4 are views illustrating operation of an oil pump control valve according to an embodiment of the present invention.

FIG. 3 shows the solenoid 200 to which power is applied. When the power is applied, the magnetic field generated in the coil 230 pulls the plunger 260, and thus the rod 150 descends and is separated from the ball valve 130. At the same time, the ball valve 130 is lowered by the pressure of the oil P supplied from the introduction port 111 to open the inlet 123. At this time, the lowered ball valve 130 is seated in the second seating groove 142 to close the discharge passage 147. Accordingly, the oil P supplied from the introduction port 111 flows into the first valve seat 120 through the inlet 123 and is discharged to the control port 112 via the first outlet 125.

Figure 4:
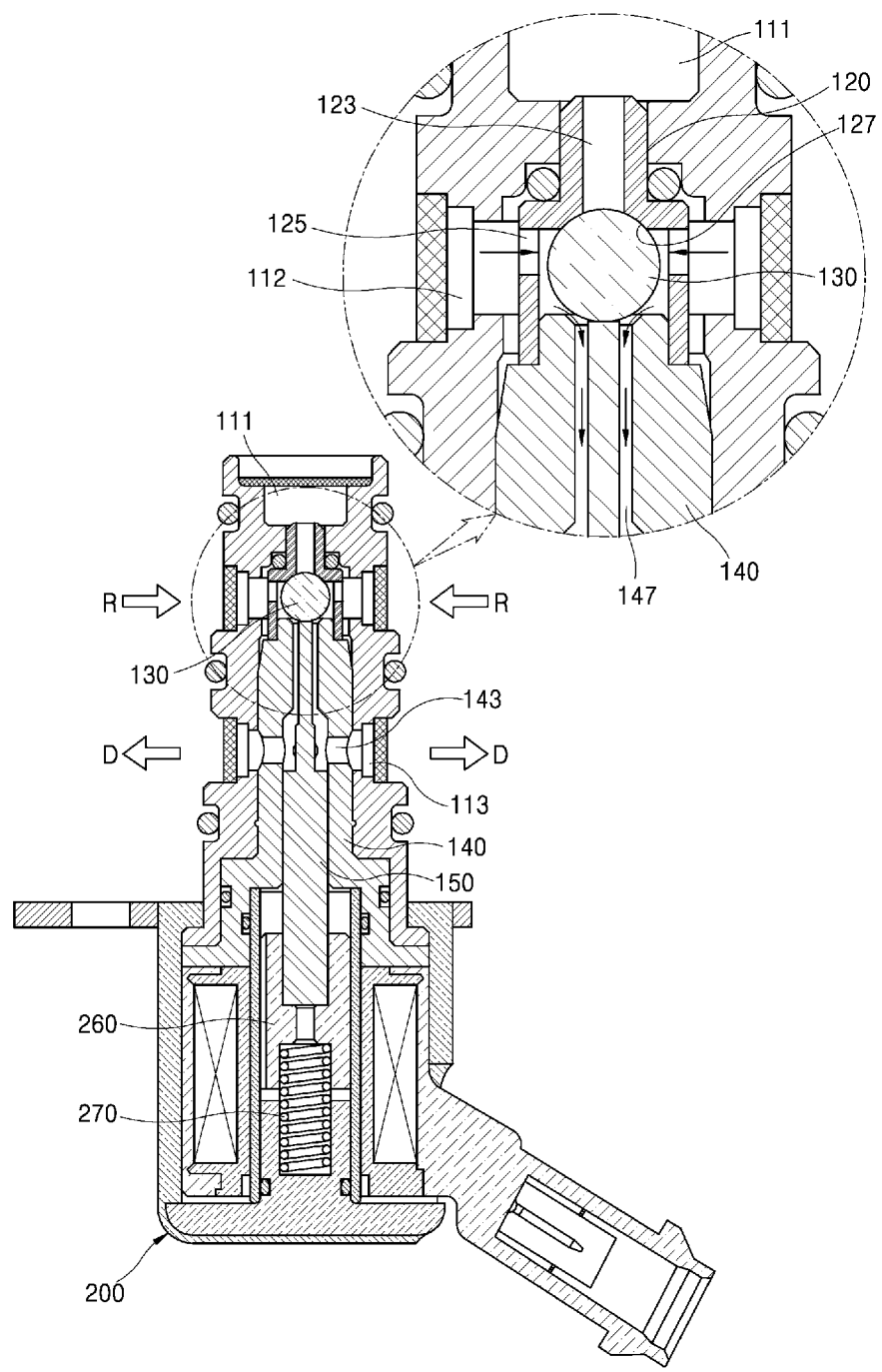
Figure 5:
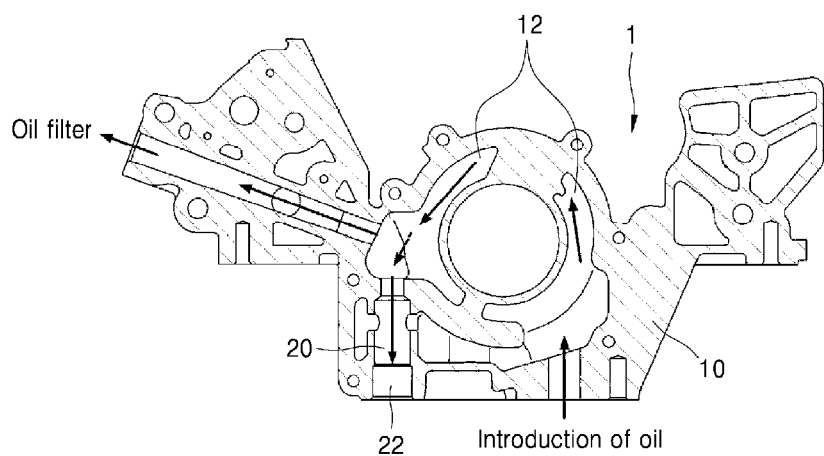
FIG. 5 is a cross-sectional view illustrating a conventional oil pump for an automobile.

As shown in FIG. 4, when the power applied to the solenoid 200 is cut off, the spring 270 lifts the plunger 260 to push up the ball valve 130. Then, the ball valve 130 is seated in the first seating groove 127, closing the inlet 123 to interrupt supply of the oil through the introduction port 111.

On the other hand, when the ball valve 130 rises and is seated in the first seating groove 127, the discharge passage 147 is opened. Thereby, the oil R discharged from the control port 112 flows back through the control port 112 and is introduced into the first valve seat 120 through the first outlet 125. The introduced oil R is transported to the second valve seat 140 through the discharge passage 147 and then discharged to the outside through the discharge port 113 via the second outlet 143.

While the present invention has been particularly shown and described with reference to exemplary embodiments thereof, those skilled in the art will appreciate that the invention is not limited to the disclosed exemplary embodiments, but is intended to cover various modifications and equivalent arrangements included within the spirit and scope of the appended claims. Therefore, the scope of the present invention should be construed as being covered by the scope of the appended claims, rather than the specific embodiments, and all technical ideas falling within the scope of the claims should be construed as being included in the scope of the present invention.

The invention claimed is:

1. An oil pump control valve comprising a valve for regulating an entry and exit of an oil and a solenoid for operating the valve, wherein the valve comprises:
   a tubular holder comprising an introduction port formed at an upper end thereof, a control port formed at an upper portion of a middle part thereof and a discharge port formed at a lower portion of the middle part;
   a first valve seat installed inside the holder and positioned between the introduction port and the control port, the first valve seat comprising an inlet connected to the introduction port and a first outlet connected to the control port and formed at an upper end and lower end thereof;
   a ball valve movably installed inside the first valve seat to open or close the inlet;
   a second valve seat installed at a lower portion of the first valve seat and communicating with an interior of the first valve seat, the second valve seat being formed in a tube shape and provided at a middle part thereof with a second outlet connected to the discharge port; and
   a rod movably installed in the second valve seat and operated by the solenoid to move the ball valve, at least a portion of the rod is smaller than an inner diameter of the second valve seat, wherein the rod is a multi-step rod comprising a large-diameter portion contacting the second valve seat and a small-diameter portion spaced apart from the second valve seat, and a discharge passage is defined between the second valve seat and the small-diameter portion,
   wherein, when the ball valve is raised to close the inlet, the oil introduced through the control port is discharged to an outside through the discharge port via the first valve seat, the second valve seat and the second outlet.

2. The oil pump control valve according to claim 1, wherein an upper end of the second valve seat is provided with a protrusion to be inserted into the first valve seat, and a lower end of the second valve seat is provided with a flange interposed between the valve and the solenoid.

3. The oil pump control valve according to claim 2, wherein an inner wall of the holder between the introduction port and the control port is provided with a partition, the partition being provided with a mount hole,
   wherein the first valve seat comprises a small-diameter tube inserted into the mount hole and a large-diameter tube formed at a lower portion of the small-diameter tube,
   wherein the inlet is formed inside the small-diameter tube, and the outlet is formed on an outer circumferential surface of the large-diameter tube.

4. The oil pump control valve according to claim 3, wherein a first seating groove is formed at a lower end of the inlet, and a second seating groove is formed at an upper end of the protrusion,
   wherein the ball valve is partially inserted into the first seating groove when the ball valve is raised, and partially inserted into the second seating groove when the ball valve is lowered.

5. The oil pump control valve according to claim 4, wherein the introduction port is formed on an upper end surface of the holder, and the control port and the discharge port are formed on an outer circumferential surface of the holder,
   wherein a plate-shaped filter is installed at an upper end of the holder, and an annular filter is installed on the outer circumferential surface of the holder.

6. The oil pump control valve according to claim 5, wherein a plurality of annular grooves are formed on an outer circumferential surface of the holder, and a plurality of O-rings for sealing is provided in the plurality of annular grooves,
   wherein one groove of the plurality of annular grooves and one O-ring of the plurality of O-rings are each provided between the introduction port and the control port, between the control port and the discharge port, and between the discharge port and a lower end of the holder, respectively.

7. The oil pump control valve according to claim 6, wherein the solenoid comprises:
- a case coupled to surround one end of the holder and one end of the second valve seat and having an accommodation space therein;
- a bobbin installed in the accommodation space, the bobbin being in close contact with the flange and having a coil wound around an outer circumferential surface thereof;
- a guide installed inside the bobbin and having an upper end inserted into the second valve seat;
- a core coupled to a lower end of the bobbin and partially inserted into the guide;
- a plunger movably installed in the guide, a lower end of the rod being inserted thereinto; and
- a spring installed between the core to elastically support the plunger.

8. The oil pump control valve according to claim 7, wherein a movement groove is formed on an outer circumferential surface of the plunger.

9. The oil pump control valve according to claim 8, further comprising:
- a bracket provided on an outer circumferential surface of the case and fixing the solenoid to a cylinder block.

* * * * *